(12) United States Patent
Jeon et al.

(10) Patent No.: US 8,257,860 B2
(45) Date of Patent: Sep. 4, 2012

(54) BATTERY MODULE AND METHOD OF MAKING THE SAME

(75) Inventors: Yoon-Cheol Jeon, Yongin-si (KR); Tae-Yong Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1115 days.

(21) Appl. No.: 11/502,532

(22) Filed: Aug. 11, 2006

(65) Prior Publication Data
US 2007/0037052 A1 Feb. 15, 2007

(30) Foreign Application Priority Data

Aug. 11, 2005 (KR) .................. 10-2005-0073772

(51) Int. Cl.
*H01M 6/46* (2006.01)
*H01M 6/42* (2006.01)
(52) U.S. Cl. ...................................... 429/152; 429/159
(58) Field of Classification Search .............. 429/149, 429/152, 153, 156–159, 99, 48, 65, 96, 100, 429/120–122; 29/623.1–623.5, 730–731
See application file for complete search history.

(56) References Cited

U.S. PATENT DOCUMENTS

| 4,100,333 | A | * | 7/1978 | Haas et al. | 429/156 |
| 6,569,561 | B1 | * | 5/2003 | Kimura et al. | 429/159 |
| 2003/0017387 | A1 | * | 1/2003 | Marukawa et al. | 429/156 |
| 2006/0115719 | A1 | | 6/2006 | Jeon et al. | |
| 2006/0115721 | A1 | | 6/2006 | Lee et al. | |

FOREIGN PATENT DOCUMENTS

| JP | 2002343324 A | * | 11/2002 |
| KR | 10-2006-0060815 A | | 6/2006 |
| KR | 10-2006-0060818 A | | 6/2006 |

OTHER PUBLICATIONS

Machine Translation and Abstract in English of KR 10-2006-0060815.*
Machine Translation and Abstract in English of JP 2002-343324.*
NiMH Battery 01.JPB, Wikipedia, 3 pages, (Aug. 22, 2008).

* cited by examiner

*Primary Examiner* — Barbara Gilliam
*Assistant Examiner* — Claire L Roe
(74) *Attorney, Agent, or Firm* — Lee & Morse, P.C.

(57) ABSTRACT

A battery module including a plurality of unit batteries, a pair of end plates located at outermost sides of the plurality of unit batteries and connecting rods disposed at first and second edges of at least one of the end plates, the first and second edges being opposite edges, wherein the connecting rods fix the pair of end plates to the plurality of unit batteries, and the connecting rods are spaced apart at different intervals along the first and second edges of the at least one end plate.

9 Claims, 7 Drawing Sheets
(2 of 7 Drawing Sheet(s) Filed in Color)

BATTERY MODULE AND METHOD OF MAKING THE SAME

BACKGROUND OF THE INVENTION

1. Field of the Invention

The present invention relates to a battery module and a method of making the same. More particularly, the present invention relates to a battery module including a plurality of unit batteries and at least one end plate, wherein the battery module is configured to provide reduced weight and/or reduced likelihood of deformation of the end plate, and a method of making the same.

2. Description of the Related Art

Batteries may be manufactured in a wide variety of forms and may employ any of a number of technologies. Generally, batteries may be classified as single-use, i.e., primary, or rechargeable, i.e., secondary, batteries. Generally, secondary batteries may be charged and discharged, unlike primary batteries. Low capacity batteries having a single cell may be used for small electronic devices such as mobile phones, notebook computers, camcorders, etc. High capacity secondary batteries, which may be constructed by connecting a plurality of cells into a package form, may be used to high power equipment such as motors, etc., e.g., drive motors of hybrid electric vehicles (HEVs).

Secondary batteries may be manufactured in various shapes, e.g., cylindrical and rectangular shapes. The secondary batteries (hereinafter referred to as unit batteries) may be serially connected to create a battery module. The unit battery may include an electrode group having positive and negative electrodes that are disposed adjacent to each other with a separator interposed therebetween. A case may be provided, the case including space for enclosing the electrode group, which may be combined with a cap assembly to close the case. Positive and negative terminals, which may be electrically connected to positive or negative collectors, respectively, in the electrode assembly, may project through the cap assembly in order to allow for external electrical connections.

The unit batteries may be arranged so that neighboring positive and negative terminals alternate, in order to simplify electrical connections. A conductor may be connected to neighboring positive and negative terminals, e.g., using nuts affixed to threaded terminals, to electrically connect the unit batteries with one another.

A battery module may include from a few to tens of unit batteries. A plurality of unit batteries may be assembled in a stack and may be clamped by one or more end plates, i.e., such that an end plate is disposed against an outer side of the first and/or last unit battery in the stack. Two end plates may be located at the outermost sides of the unit batteries and the end plates may be fixed together to clamp the stack by using connecting rods attached to the end plates.

During operation of the battery module, insides of the unit batteries may swell due to overcharge or overdischarge. Swelling loads may accumulate in the stacked unit batteries and may be applied to the end plates, thereby causing bending deformation of the end plates. The bending deformation of the end plates may be caused by, e.g., stress concentration due to inhomogeneous contact between the connecting rods and the end plates.

It will be appreciated that bending deformation of an end plate may be reduced by increasing the strength of the end plate. However, such an increase in strength is generally achieved by using a thicker end plate, which may result in increased weight and cost of the battery module. Accordingly, there is a need for a battery module configured to reduce or eliminate bending deformation of the end plate without undue increases in weight.

SUMMARY OF THE INVENTION

The present invention is therefore directed to a battery module and a method of making the same, which substantially overcome one or more of the problems due to the limitations and disadvantages of the related art.

It is therefore a feature of an embodiment of the present invention to provide a battery module having connecting rods that are positioned so as to reduce or eliminate bending deformation of end plates of the battery module.

It is therefore another feature of an embodiment of the present invention to provide a battery module including fixing grooves having a predetermined depth, the depth configured to avoid stress concentration in the end plates.

It is therefore yet another feature of an embodiment of the present invention to provide a battery module configured to reduce or eliminate bending deformation of the end plates without requiring the use of thicker end plates.

At least one of the above and other features and advantages of the present invention may be realized by providing a battery module including a plurality of unit batteries, a pair of end plates located at outermost sides of the plurality of unit batteries, and connecting rods disposed at first and second edges of at least one of the end plates, the first and second edges being opposite edges, wherein the connecting rods fix the pair of end plates to the plurality of unit batteries, and the connecting rods are spaced apart at different intervals along the first and second edges of the at least one end plate.

A first connecting rod may be disposed at the first edge of the at least one end plate, a second connecting rod may be disposed at the second edge of the at least one end plate, and a distance from a center of the first connecting rod to a third edge of the end plate may be greater than a distance from a center of the second connecting rod to the third edge of the end plate, wherein the third edge connects the first and second edges.

A third edge of the at least one end plate may extend between the first and second edges, and the connecting rods may be spaced apart from the third edge by an interval of from about L/7 to about 2L/7, L being a length of the respective first and second edges. Each unit battery may include projecting electrode terminals, and the electrode terminals may project toward at least one of the first and second edges. Connecting rods installed along an edge towards which the electrode terminals project may be spaced further apart than connecting rods installed in the opposite edge.

The unit batteries may be rectangular. Ends of the connecting rods may be provided with screw threads and the connecting rods may be engaged by nuts, fixing members may protrude from the first and second edges, each fixing member may have a hole configured to receive a connecting rod, and fixing grooves may be defined around the holes, the fixing grooves configured to receive nuts and/or heads of the connecting rods. A depth of the fixing grooves may be from about T/3 to about 2T/3, T being a thickness of the end plate.

At least one of the above and other features and advantages of the present invention may also be realized by providing a battery module including a plurality of unit batteries, a pair of end plates contacting outermost sides of the unit batteries, and connecting rods inserted into the end plates to engage and fix the end plates, wherein each end plate includes installing edges into which the connecting rods are installed and connecting edges extending between the installing edges, and each connecting rod is spaced apart from a nearest connecting edge by an interval of about L/7 to about 2L/7, L being a length of the corresponding installing edge.

Connecting rods installed along a first installing edge may be separated by a first distance, connecting rods installed along a second installing edge opposite the first installing edge may be separated by a second distance, and the first distance may be less than the second distance. Each unit battery may include terminals that project in the direction of the first installing edge. The connecting rods installed along the first installing edge may be disposed between two terminals of each unit battery.

At least one of the above and other features and advantages of the present invention may further be realized by providing a method of making a battery module, including providing a plurality of unit batteries, setting positions of first and second connecting rods with respect to edges of an end plate in accordance with Equation 1 such that a stress D1 of the end plate is a predetermined amount:

$$D1(A,B) = -0.000557A^2B^2 + 0.02A^2B + 0.345A^2 + 0.045AB^2 - 1.102AB - 17.735A - 0.624B^2 + 8.37B + 1210.525 \quad \text{(Eq. 1)},$$

wherein the first connecting rod is disposed along a first edge of the end plate, the second connecting rod is disposed along a second edge of the end plate, the second edge being opposite the first edge, A is an interval between a center of the first connecting rod and a third edge of the end plate, the third edge extending between the first and second edges, and B is an interval between a center of the second connecting rod and the third edge, disposing the end plate adjacent to an outermost battery of the plurality of unit batteries, disposing another plate adjacent to an opposite outermost battery of the plurality of unit batteries, and clamping the plurality of unit batteries between the end plate and the other plate using the first and second connecting rods.

The predetermined amount may be a minimum stress. The method may further include determining a maximum acceptable stress D1 before setting the positions of the first and second connecting rods, wherein the predetermined about may be less than or equal to the maximum acceptable stress D1.

The method may further include setting a depth H of a fixing groove in the end plate in accordance with Equation 2 such that the stress D2 is a predetermined amount:

$$D2(B,H) = 0.344B^2H^2 - 1.115B^2H + 1.008B^2 - 29.098BH^2 + 89.945BH - 59.599B + 987.926H^2 - 2794.733H + 2738.608 \quad \text{(Eq. 2)},$$

wherein the fixing groove surrounds a hole in the end plate configured to receive a connecting rod, the fixing groove configured to receive a nut and/or head. The depth H of the fixing groove in the end plate may be set in accordance with Equation 2 such that the stress D2 is minimized. At least one of the above and other features and advantages of the present invention may further be realized by providing a battery module made according to the method described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
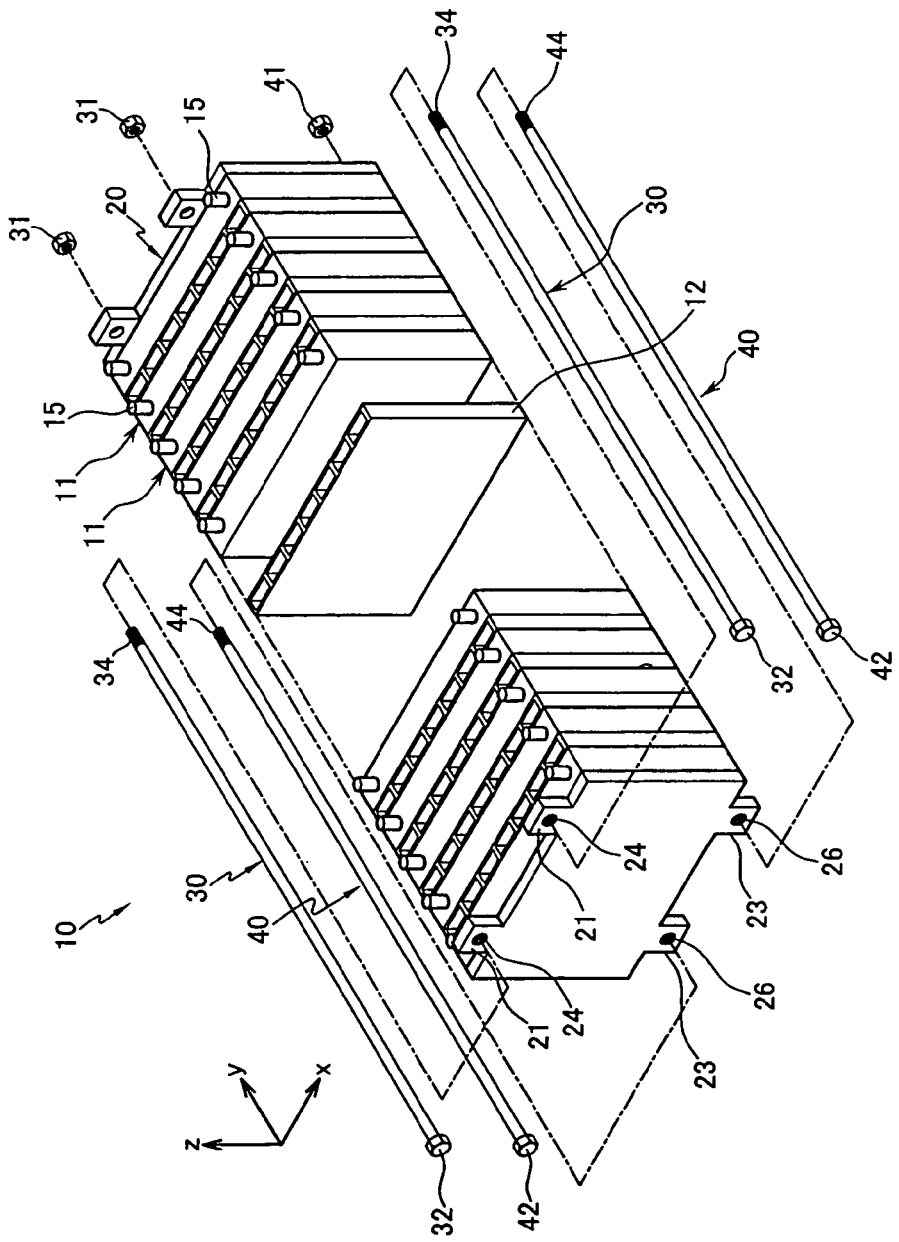
FIG. 1 illustrates an exploded perspective view of a battery module according to first and second embodiments of the present invention.

Korean Patent Application No. 10-2005-0073772, filed on Aug. 11, 2005, in the Korean Intellectual Property Office, and entitled: "Battery Module," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In a battery module according to an embodiment of the present invention, stress applied to an end plate may be minimized by setting positions of a connecting rods relative to the end plate, which may reduce or prevent deformation of the end plate. Accordingly, reduced deformation of the end plate may be achieved without the need for a thick end plate, allowing thin end plates to be used. Further, since thick end plates may not be required, the weight of the battery module may be reduced. Moreover, the end plate may be prevented from breaking due to stress concentration by dispersing stress generated by unit batteries of the battery module.

Figure 2:
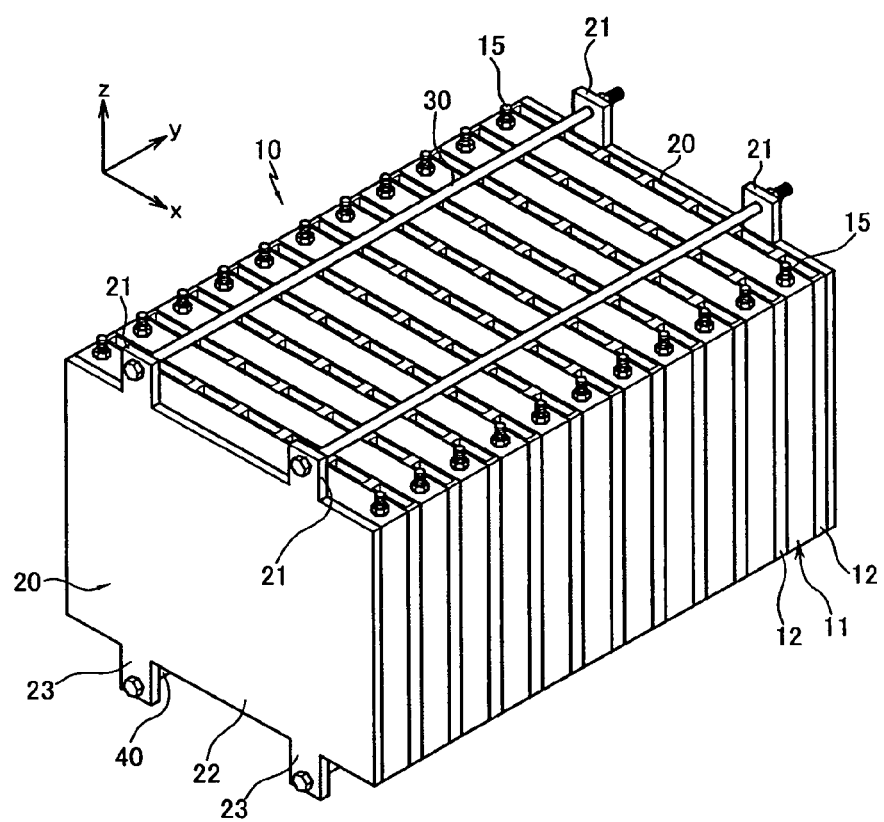
FIG. 2 illustrates a perspective view of the battery module of FIG. 1.

FIG. 1 illustrates an exploded perspective view of a battery module according to first and second embodiments of the present invention, and FIG. 2 illustrates a perspective view of the battery module of FIG. 1. Referring to FIGS. 1 and 2, the battery module 10 according to the first embodiment of the present invention may be a high capacity battery module and may include a plurality of unit batteries 11, the unit batteries 11 arranged at predetermined intervals.

Each unit battery 11 may include an electrode assembly having positive and negative electrodes isolated from one another by a separator interposed therebetween, the positive and negative electrodes being electrically coupled to respective electrode terminals 15. Thus, each unit battery 11 may constitute a secondary battery that can be repeatedly charged or discharged to a predetermined level.

Partitions 12 for maintaining the interval between the unit batteries 11 and flowing a coolant between the unit batteries 11 may be located between the unit batteries 11. The unit batteries 11 and the partitions 12 may be alternately arranged in the battery module 10.

The unit batteries 11 may be fixed in place by one or more end plates 20, e.g., two end plates 20 disposed adjacent to outermost unit batteries 11. The end plates 20 may clamp the plurality of unit batteries 11. The battery module 10 may include connecting rods 30 and 40 for connecting the end plates 20, such that a single battery module 10 includes connecting rods 30 and 40, and end plates 20 that fix the plurality of unit batteries 11 in place.

Figure 3:
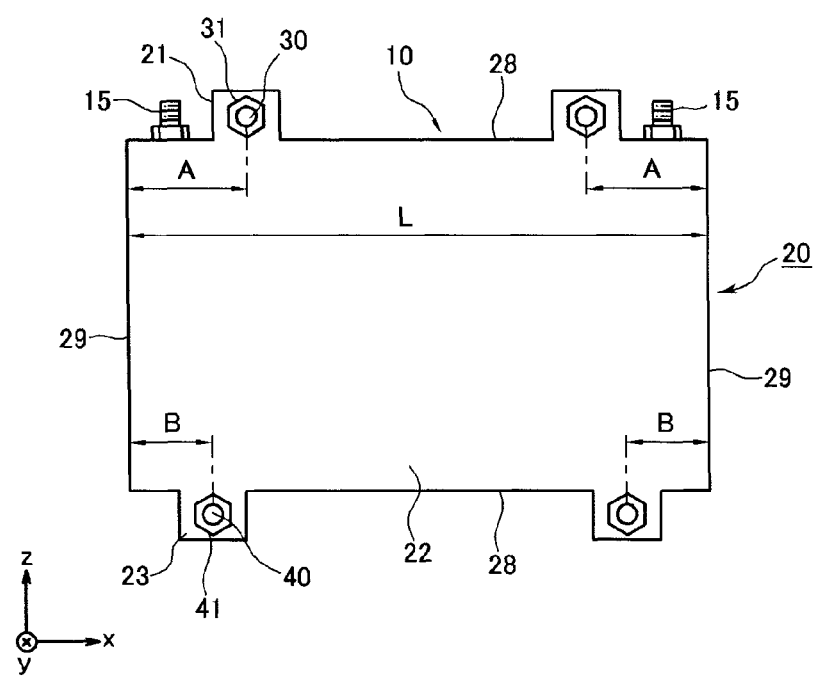
FIG. 3 illustrates a front view of the battery module of FIG. 1.

FIG. 3 illustrates a front view of the battery module of FIG. 1. Referring to FIG. 3, the end plate 20 may include a flat plate portion 22, which may have about the same size as the side surface of the outermost unit battery 11 of the plurality of unit batteries 11, such that the flat plate portion 22 may cover an entire side surface of the unit battery 11. The flat plate portion 22 may have a generally rectangular shape defined by two opposing first edges 28, hereinafter referred to as installing edges, from which fixing members 21 and 23 project, and two second edges 29, hereinafter referred to as connecting edges, which extend between the two installing edges 28.

Two fixing members 21 may be formed at one edge of the flat plate portion 22 and two fixing members 23 may be formed at an opposite edge of the flat plate portion 22. Holes 24 and 26 may be formed in the fixing members 21 and 23, respectively (see FIG. 5). The connecting rods 30 and 40 for fixing the end plates 20 may be inserted into the holes 24 and 26, respectively.

Referring again to FIG. 1, the connecting rods 30 and 40 may have a bolt shape. One end of the connecting rods 30 and 40 may be provided with heads having a flange shape. The other end of the connecting rods 30 and 40 may be provided with screw threads 34 and 44, to be combined with nuts 31 and 41. The connecting rods 30 and 40 may be inserted into the holes 24 and 26 of the end plates 20 and may be fixed to the end plates 20 by nuts 31 and 41, which are threaded on. The connecting rods 30 and 40, and the end plates 20, may press the unit batteries 11 through the clamping force of the nuts 31 and 41, so as to fix the unit batteries 11.

Pairs of connecting rods 30 and 40 may be installed into the fixing members 21 and 23 that project from the connecting edges 28 so as to clamp the unit batteries 11. Referring to FIG. 3, an interval A between the a pair of connecting rods 30 installed along one installing edge 28 may be different from an interval B between a pair of connecting rods 40 along the other installing edge 28. That is, the respective pairs of connecting rods 30 and 40 may be located at different positions of the corresponding installing edges 28. Accordingly, stress applied to the end plate 20 may be dispersed, such that the end plate 20 may be less likely to deform.

The positions of the connecting rods 30 and 40 with respect to the corresponding installing edges 28 may be defined by intervals A and B, where interval A is a distance of the connecting rods 30 from the corresponding connecting edges 29 and interval B is a distance of the connecting rods 40 from the corresponding connecting edges 29. In the battery module 10 according to the first and second embodiments of the present invention, the locations of the connecting rods 30 and 40, i.e., the intervals A and B, may be set such that the stress applied to the end plate 20 is a predetermined amount, e.g., a minimum amount.

Referring to FIG. 3, interval A is the interval between a center of the connecting rod 30 and the corresponding connecting edge 29 of the end plate 20, as determined in the x-axis direction. Interval B is the interval between a center of the connecting rod 40, which is disposed along an opposite installing edge 28, and the connecting edge 29, as determined in the x-axis direction.

In a battery module 10 according to the first embodiment of the present invention, a relationship between the intervals A and B, where interval A corresponds to an interval along the upper edge of the end plate 20 and interval B corresponds to an interval along the lower edge of the end plate 20, may be set according to the following Equation 1:

$$D1(A,B) = -0.000557A^2B^2 + 0.02A^2B + 0.345A^2 + 0.045AB^2 - 1.102AB - 17.735A - 0.624B^2 + 8.37B + 1210.525 \quad \text{(Equation 1)}$$

where D1 is the stress applied to the end plate 20. That is, intervals A and B may be set so that the stress D1 is a predetermined amount. Intervals A and B may be set so as to minimize the stress D1.

Equation 1 is applicable to various types of end plates, without being restricted to particular structures, materials, etc.

Figure 6:
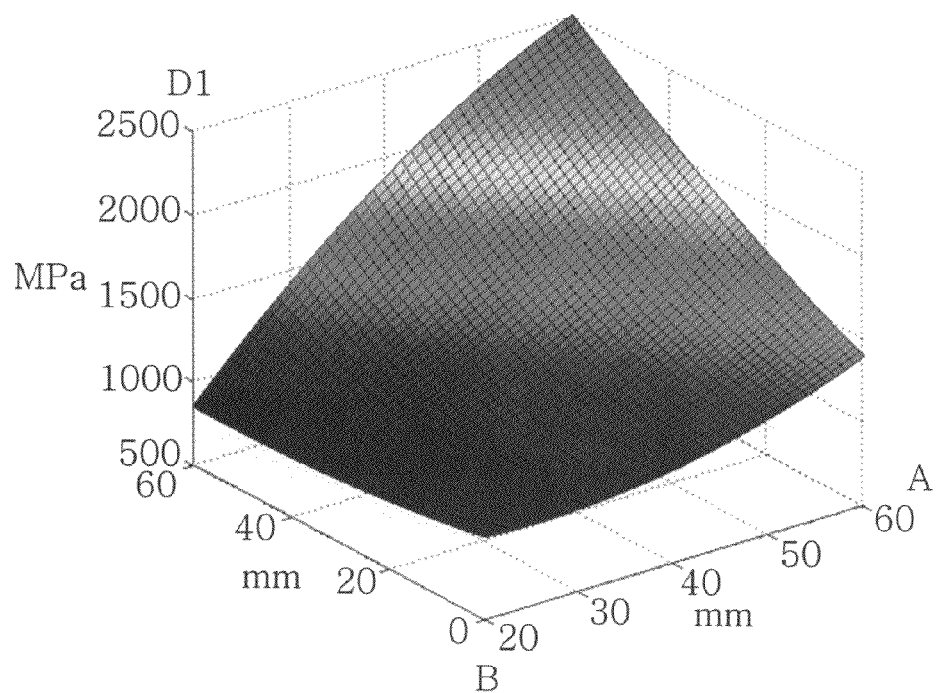
FIG. 6 illustrates a graph of a relationship between stress and positions of connecting rods in end plates for a battery module according to the first embodiment of the present invention.

FIG. 6 illustrates a graph of a relationship between stress and positions of connecting rods in end plates for a battery module according to the first embodiment of the present invention. That is, FIG. 6 is a graph of Equation 1.

As shown in the graph, the stress D1 applied to the end plate 20 is dependent on intervals A and B. Referring to FIG. 6, when stress D1 is minimized, interval A is greater than interval B. As a whole, the stress D1 is less where interval A is greater than interval B.

Referring to FIG. 6, when the unit batteries 11 are arranged such that electrode terminals 15 of the unit batteries 11 face upward, the stress applied to the end plate 20 decreases as interval B becomes less than interval A. Accordingly, interval A, between the connecting rod 30 installed in the upper portion of the end plate 20 and the corresponding connecting edge 29, may be greater than interval B, between the connecting rod 40 installed in the lower portion of the end plate 20 and the connecting edge 29. Interval A may be determined, within an allowable range of stress values D1, by following Equation 1. Similarly, interval B may also determined, within the allowable range of stress values D1, by following Equation 1. In particular, the position of the connecting rod 40 may be set, i.e., interval B may be set, using interval A and Equation 1.

According to the second embodiment of the present invention, interval A between the connecting rod 30, which is disposed along the upper portion of the end plate 20, and the corresponding connecting edge 29 of the end plate 20 may be from about L/7 to about 2L/7, wherein L is a horizontal length of the end plate 20 in the x-axis direction. An interval A that is not from about L/7 to about 2L/7 may result in additional stress being applied to the end plate 20, which may cause deformation of the end plate 20.

The interval B between the connecting rod 40, which is disposed along the lower portion of the end plate 20, and the corresponding connecting edge 29 of the end plate 20 may be from about L/7 to about 2L/7. An interval B that is not from about L/7 to about 2L/7 may result in additional stress being applied to the end plate 20, which may cause deformation of the end plate 20.

Figure 4:
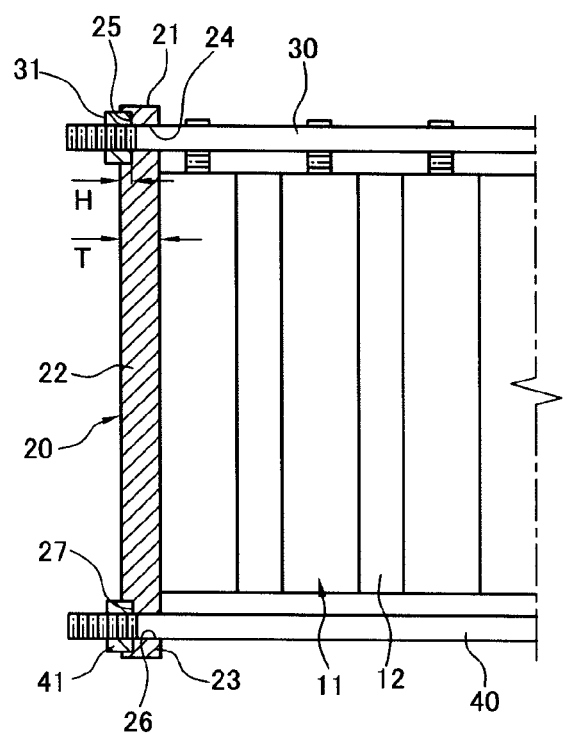
FIG. 4 illustrates a side sectional view of a battery module according to third and fourth embodiments of the present invention.
Figure 5:
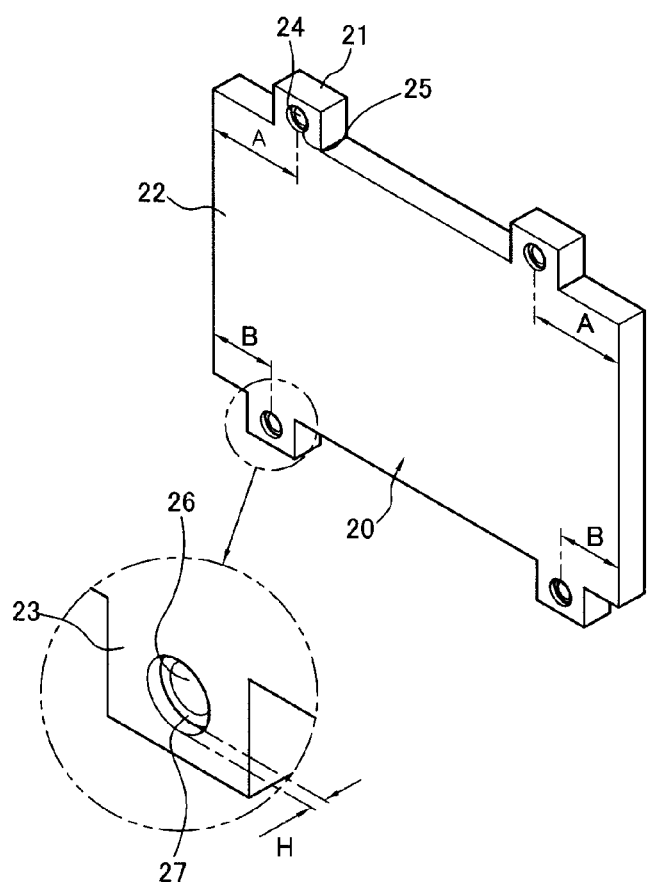
FIG. 5 illustrates perspective and detailed views of an end plate of the battery module of FIG. 4.

FIG. 4 illustrates a side sectional view of a battery module according to third and fourth embodiments of the present invention, and FIG. 5 illustrates a perspective and detailed views of an end plate of the battery module of FIG. 4. Referring to FIGS. 4 and 5, the fixing member 21 may include a fixing groove 25 formed in the surface of the fixing member 21, i.e., the outer surface, the fixing groove 25 extending around the circumference of the hole 24 in the fixing member 21. Similarly, the fixing member 23 may include a fixing groove 27 that is disposed around the circumference of the hole 26. The fixing groove 25 and/or the fixing groove 27 may have a depth H, as determined from the outer surface of the end plate 20. The depth H of the fixing groove 25 may be the same as, or different from, the depth H of the fixing groove 27. The depth H may be set as described below.

The positions of the holes 24 and 26 for the connecting rods 30 and 40, respectively, may be set using Equation 1 as described above. An interval between a center of the hole 24 of the fixing member 21 and the connecting edge 29 of the end plate 20, as determined in the x-axis direction, may equal interval A. An interval between a center of the hole 26 of the fixing member 23 and the connecting edge 29 may equal interval B.

The fixing grooves 25 and 27 may be configured to receive the nuts 31 and 41 and/or the heads 32 and 42 of the connecting rods 30 and 40, respectively, such that the nuts 31 and 41 and/or the heads 32 and 42 may be inserted into the fixing grooves 25 and 27. By inserting the connecting rods 30 and 40 and/or the nuts 31 and 41 into the fixing grooves 25 and 27, respectively, stress in the end plate may be dispersed so as to reduce stress concentration. The stress applied to the end plate 20 may be dependent on the depth of the fixing grooves 25 and 27.

In a battery module 10 according to the third embodiment of the present invention, a relation between the depth H of the fixing groove 27 and the position of the hole 26 may be set according to the following Equation 2:

$$D2(B,H) = 0.344B^2H^2 - 1.115B^2H + 1.008B^2 - 29.098BH^2 + 89.945BH - 59.599B + 987.926H^2 - 2794.733H + 2738.608 \quad \text{(Equation 2).}$$

where D2 is the stress applied to the end plate 20. That is, the interval B and the depth H may be set so that the stress D2 is a predetermined amount. The interval B and the depth H may be set so as to minimize D2. Referring to FIG. 5, interval B is the interval between the connecting rods 40 installed in the lower portion of the end plate 20 and the corresponding connecting edges 29 in the x-axis direction, and the depth H is the depth of the fixing grooves 27 of the fixing members 23 formed at the lower edge of the end plate 20. Similarly, Equation 2 may be also applied to the relationship between the connecting rods 30 installed in the upper portion of the end plate 20 and the fixing grooves 25 formed in the fixing members 21 at the upper portion of the end plate 20.

Equation 2 is applicable to various types of end plates, without being restricted to particular structures, materials, etc.

Figure 7:
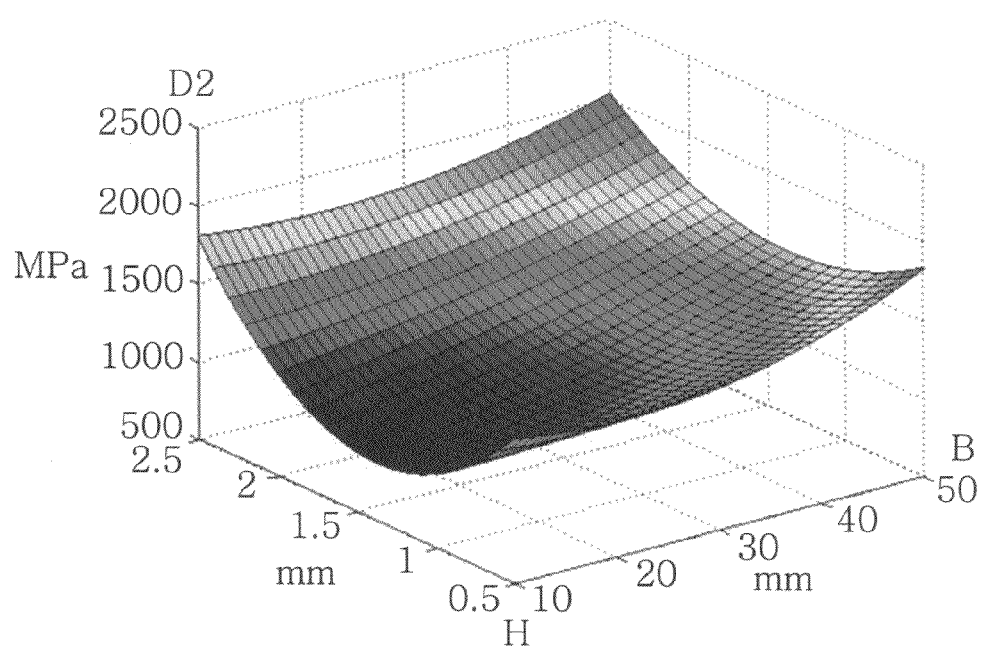
FIG. 7 illustrates a graph of a relationship among stress, a depth of fixing grooves and positions of connecting rods for a battery module according to the third embodiment of the present invention.

FIG. 7 illustrates a graph of a relationship among stress, a depth of fixing grooves and positions of connecting rods for a battery module according to the third embodiment of the present invention. That is, FIG. 7 illustrates a graph of Equation 2. As shown in the graph, the depth H at which the stress is minimized can be set using B, where the depth H is set using an allowable range of values for stress D2 in Equation 2. In particular, the depth H of the fixing grooves may be set based on the interval B using Equation 2. Using interval A, the depth H of the fixing grooves 25 may be similarly determined by substituting A for B in equation 2. Accordingly, using interval A and interval B, the depths H of the fixing grooves 25 and 27, respectively, may be set using Equation 2, such that the stress applied to the end plate 20 may be set to a predetermined amount, e.g., a minimum amount or within an allowable range of values for stress D2. Note that the positions of the connection rods 30 and 40 may be set before, after or at the same time as the depths of the fixing grooves 25 and 27. That is, the order of setting the positions of the connecting rods 30 and 40 and setting the depths of the fixing grooves 25 and 27 is not limited.

According to the fourth embodiment of the present invention, the depth H of the fixing grooves 27 may be about T/3 to about 2T/3, wherein T is the thickness of the end plate 20. If the depth H of the fixing grooves 27 is not about T/3 to about 2T/3, the stress applied to the end plate 20 may increase, which may cause deformation of the end plate 20.

A method of making a battery module 10 according to the first and third embodiments of the present invention may include providing a plurality of unit batteries 11 and setting positions of connecting rods 30 and 40 with respect to edges of an end plate in accordance with Equation 1 such that a stress D1 of the end plate 20 is a predetermined amount, which may be, e.g., a minimum amount or an amount that is determined based on an acceptable level of stress D1 in the end plate 20. The connecting rod 30 may be disposed along an upper installing edge 28 of the end plate 20 and the connecting rod 40 may be disposed along a lower installing edge 28.

The end plate 20 may be disposed adjacent to an outermost unit battery 11 of the plurality of unit batteries 11, while another plate, e.g., another end plate 20, may be disposed adjacent to an opposite outermost unit battery 11. The end plates 20 may then be clamped to the plurality of unit batteries 11 so as to fix the unit batteries 11 between the end plates 20 using the connecting rods 30 and 40.

Making the battery module 10 may include determining a maximum acceptable stress D1 before setting the positions of the connecting rods 30 and 40. The predetermined stress D1 for the end plate 20 may be set to be less than or equal to the maximum acceptable stress D1.

The method may also include setting a depth H of fixing groove 25 and/or 27 in the end plate in accordance with Equation 2 such that the stress D2 is a predetermined amount, which may be, e.g., a minimum amount or an amount that is determined based on an acceptable level of stress D2 in the end plate 20.

Exemplary embodiments of the present invention have been disclosed herein, and although specific terms are employed, they are used and are to be interpreted in a generic and descriptive sense only and not for purpose of limitation. For example, the battery module described above may be employed to power a hybrid electric vehicle (HEV). However, it will be understood that the battery module is not limited thereto. Similarly, while the battery module has been described as having rectangular unit batteries, unit batteries of various other shapes may be employed. Further, while reference has been made to relative terms such as "upper" and "lower," it will be appreciated that the embodiments of the present invention are not limited to any particular orientation. Additionally, it will be appreciated that the embodiments of the present invention are not limited to particular battery technologies, primary or secondary batteries, etc., and that the use of the term "rechargeable" is to be interpreted broadly and may include, e.g., refueling of fuel cells. Accordingly, it will be understood by those of ordinary skill in the art that various changes in form and details may be made without departing from the spirit and scope of the present invention as set forth in the following claims.

What is claimed is:

1. A battery module, comprising:
    a plurality of unit batteries;
    a pair of end plates located at outermost sides of the plurality of unit batteries; and
    four connecting rods disposed in respective pairs at first and second edges of at least one of the end plates, the first and second edges being opposite edges, a third edge of the at least one end plate extending between the first and second edges of the at least one end plate, wherein:
    the first and second edges of the at least one end plate each have two fixing members protruding therefrom, two of the connecting rods being coupled to two respective fixing members of the first edge, and two of the connecting rods being coupled to two respective fixing members of the second edge,
    the connecting rods fix the pair of end plates to the plurality of unit batteries,
    the connecting rods are spaced apart at different intervals along the first and second edges of the at least one end plate, two of the connecting rods installed along the first edge of the at least one end plate being spaced closer to one another than are two of the connecting rods installed along the second edge of the at least one end plate, and
    each unit battery includes projecting electrode terminals, the electrode terminals projecting towards the first edges and away from the second edges, the electrode terminals being disposed along the first edge closer to the third edge than the connecting rods installed along the first edge, such that the electrode terminals project towards the first edge of the at least one end plate in a position between the third edge and the connecting rods installed along the first edge.

2. The battery module as claimed in claim 1, wherein the connecting rods are spaced apart from the third edge by an interval of from about L/7 to about 2L/7, L being a length of the respective first and second edges.

3. The battery module as claimed in claim 1, wherein the unit batteries are rectangular.

4. The battery module as claimed in claim 1, wherein ends of the connecting rods are provided with screw threads and the connecting rods are engaged by nuts,
    each fixing member has a hole configured to receive a connecting rod, and
    fixing grooves are defined around the holes, the fixing grooves configured to receive nuts and/or heads of the connecting rods.

5. The battery module as claimed in claim 4, wherein a depth of the fixing grooves is from about T/3 to about 2T/3, T being a thickness of the end plate.

6. A battery module, comprising:
    a plurality of unit batteries;
    a pair of end plates contacting outermost sides of the unit batteries; and
    four connecting rods inserted into the end plates to engage and fix the end plates,
    wherein each end plate includes installing edges into which the connecting rods are installed and connecting edges extending between the installing edges, the installing edges each having two fixing members protruding therefrom, two of the connecting rods being coupled to two respective fixing members of a first installing edge, and two of the connecting rods being coupled to two respective fixing members of a second installing edge, and
    each connecting rod is spaced apart from a nearest connecting edge by an interval of about L/7 to about 2L/7, L being a length of the corresponding installing edge.

7. The battery module as claimed in claim 6, wherein two of the connecting rods installed along the first installing edge are separated by a first distance,
    two of the connecting rods installed along the second installing edge opposite the first installing edge are separated by a second distance, and
    the first distance is less than the second distance.

8. The battery module as claimed in claim 7, wherein each unit battery includes terminals that project in the direction of the first installing edge.

9. The battery module as claimed in claim 8, wherein the two connecting rods installed along the first installing edge are disposed between two terminals of each unit battery.

* * * * *